United States Patent [19]

Eckardt et al.

[11] Patent Number: 4,473,404

[45] Date of Patent: Sep. 25, 1984

[54] SHAPED ARTICLES MADE FROM EXPANDED MINERALS

[75] Inventors: Peter Eckardt, Hofheim am Taunus; Franz J. Voetz, Camberg, both of Fed. Rep. of Germany

[73] Assignee: Hoechst Aktiengesellschaft, Fed. Rep. of Germany

[21] Appl. No.: 570,429

[22] Filed: Jan. 13, 1984

Related U.S. Application Data

[63] Continuation of Ser. No. 368,657, Apr. 15, 1982, abandoned.

[30] Foreign Application Priority Data

Apr. 18, 1981 [DE] Fed. Rep. of Germany ....... 3115758

[51] Int. Cl.$^3$ ................................................. C04B 19/04
[52] U.S. Cl. ......................................... 106/84; 106/85; 106/104; 106/DIG. 2
[58] Field of Search ............... 106/84, 85, 104, 308 O, 106/308 N, DIG. 2, DIG. 3; 501/189, 111

[56] References Cited

U.S. PATENT DOCUMENTS 3,966,482 6/1976 Cassidy et al. ...................... 106/85
4,138,268 2/1979 Vogel et al. ........................ 106/84

FOREIGN PATENT DOCUMENTS 1221387 7/1966 Fed. Rep. of Germany ... 106/DIG. 2
321501 1/1972 U.S.S.R. ...................... 106/DIG. 2

*Primary Examiner*—James Poer
*Attorney, Agent, or Firm*—Connolly and Hutz

[57] ABSTRACT

Shaped articles made from expanded minerals, otained by using a mineral binder system composed either of calcium aluminate and aluminum phosphate or of waterglass and a catalyst to consolidate an expanded mineral which has been rendered hydrophobic and wherein the expanded mineral is rendered hydrophobic by means of an organosiloxane.

5 Claims, No Drawings

SHAPED ARTICLES MADE FROM EXPANDED MINERALS

This is a continuation of application Ser. No. 368,657, filed Apr. 15, 1982, and now abandoned.

Expanded minerals are prepared by expanding perlite, vermiculite, mica, clay or other water-containing minerals at temperatures of 1,000° to 1,300° C. Expanded minerals are characterized by having an internal surface area which is enormously large compared to its external surface area. When in contact with water, these minerals can absorb up to 3 times their weight of water.

The use of loose fillings of such expanded minerals as insulating material in hollow box ceilings and cavity walls has been common practice for years. However, in this use the formation of dust by these materials as well as their very hydrophilic character are a nuisance. An additional disadvantage is that the entire filling pours from the opening when such ceilings or walls have to be opened.

To overcome this disadvantage attempts have been made to consolidate expanded minerals by means of bitumen or melamine- or phenol-formaldehyde resins. However, these materials either are flammable or they must be used at a concentration which is so high that they are economically hardly acceptable. It is also known to bond slightly expanded minerals by means of inorganic binders. If cements, such as, for example, Portland cement, are used, the addition of large amounts of water produces a perlite concrete which has densities between 600 and 1,000 g/liter after a long drying period.

Perlite and vermiculite can also be bonded by means of monoaluminum phosphate, as described, for example, in German Offenlegungsschrift No. 2,847,807. Here too, very large amounts of water must be added to obtain processable compositions. In addition, the binder must be admixed to the dry composition in amounts of between 95 and 105%. To improve the mechanical cohesion mineral fibers have to be added.

It has now been found that shaped articles made from expanded minerals of the abovementioned type and having improved strength can be obtained if the expanded minerals are first rendered hydrophobic and then consolidated by means of a mineral binder system.

The invention thus relates to shaped articles made from expanded minerals and obtained by using a mineral binder system composed either of calcium aluminate and aluminum phosphate or of waterglass and a catalyst to consolidate an expanded mineral which has been rendered hydrophobic and wherein the expanded mineral is rendered hydrophobic by means of an organosiloxane of the formulae

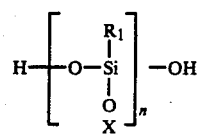

in which $R_1$ denotes $C_1$-$C_7$-alkyl, preferably methyl, $C_2$-$C_7$-alkenyl, phenyl or benzyl, X denotes an alkali metal ion and n denotes a number from 1 to 10,

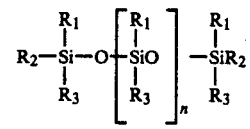

in which $R_1$, $R_2$ and $R_3$ denote $C_1$-$C_8$-alkyl, preferably methyl, $C_2$-$C_8$-alkenyl, phenyl, benzyl or styryl and n denotes a number from 1 to 1,000,

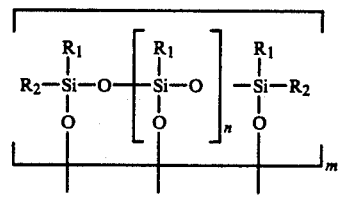

in which $R_1$ and $R_2$ denote $C_1$-$C_8$-alkyl, preferably methyl, $C_2$-$C_8$-alkenyl, phenyl, benzyl or styryl and n denotes a number from 1 to 100 and m denotes a number from 1 to 100 or

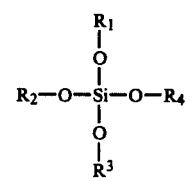

in which $R_1$ and $R_2$ can be identical or different and denote $C_1$-$C_{20}$-alkyl, $C_2$-$C_{18}$-alkenyl, $C_1$-$C_{12}$-alkylphenyl, $C_2$-$C_{18}$-acyl or $C_2$-$C_{18}$-alkyl which is substituted in the ω-position by a carboxyl, amino, hydroxyl or oxirane group and $R_3$ and $R_4$ can be identical or different and denote $C_1$-$C_4$-alkyl, $C_2$-$C_7$-alkenyl, phenyl, benzoyl or benzyl.

The expanded minerals are in general rendered hydrophobic by the spraying on of organosiloxanes, for example, in the form of aqueous, approximately 2 to 10% strength solutions, in the case of products (a) and (d). Thereafter, the expanded mineral is dried. The organosiloxanes (b) and (c) can be sprayed onto the expanded mineral directly in undiluted form. The amount of organosiloxane, relative to the expanded material, is in all cases 0.1 to 5, preferably 0.2 to 3.5, % by weight.

To consolidate the expanded mineral thus rendered hydrophobic, either a mixture of calcium aluminate and aluminum phosphate or waterglass is used. In the first case, the expanded mineral is first mixed with calcium aluminate and an aqueous solution of primary aluminum phosphate is then added. This composition is then introduced into the desired mold where consolidation is effected by action of pressure and heat. However, it is also possible without difficulty to apply the calcium aluminate together with the organosiloxane to the expanded mineral and later to add only the aluminum phosphate.

Possible calcium aluminates are alumina cements which in general are composed of 25-44% of CaO, 35-44% of $Al_2O_3$, 4-12% of $Fe_2O_3$, 0-10% of FeO and 3-11% of $SiO_2$. Such alumina cements are essentially composed of calcium aluminates of the formulae CaO.Al$_2$O$_3$, CaO.2Al$_2$O$_3$ or CaO.7Al$_2$O$_3$.

In the solid state, the proportion of calcium aluminate is 10 to 50, preferably 30 to 40, % by weight, relative to the aluminum phosphate. To obtain adequate consolidation of the shaped articles, 2 to 25, preferably 5 to 15, % by weight of solid aluminum phosphate, relative to the expanded minerals which have been rendered hydrophobic, are required. The aluminum phosphate is used as an approximately 40–60% strength aqueous solution and possibly still further diluted with water, added to the mixture of expanded mineral which has been rendered hydrophobic and calcium aluminate, and the mixture is mixed in a mixing unit. In this step, further fillers, such as, for example, quartz, aluminum oxide, foamed plastics, silicon carbide, zinc oxide or mineral fibers as well as synthetic fibers made of polyester, polyacrylonitrile or aromatic polyamides can also be incorporated. The amount of water is in general so chosen that the entire mixture is well-moistened.

After a mixing period of about 2 to 10 minutes, the moist mixture is introduced into the desired mold and compacted under pressure. After 5 to 10 minutes the setting process has already progressed so far that the shaped article can be demolded. A further consolidation is effected by heating at about 140° to 250° C.

When using waterglass as the mineral binder, the mineral which has first been rendered hydrophobic as described above, is mixed with waterglass and a catalyst and after a mixing period of about 2–10 minutes, the resulting mixture is introduced into an appropriate mold where the mixture is consolidated under pressure. After 5 to 30 minutes the shaped articles can be removed from the mold. To remove the water, they are finally dried, either by allowing them to stand at room temperature or, if drying at a higher rate is desired, by heating them, for example at 120° to 150° C. for about 5 minutes.

Those products are possible for use as waterglass which contain SiO$_2$ and Na$_2$O in weight ratios of 4.5:1 to 2.5:1, preferably 3.9:1 to 3.1:1 or SiO$_2$ and K$_2$O in ratios of 2.8:1 to 1.5:1, preferably 2.3:1 to 1.9:1, corresponding to 30–60 Be°.

The catalysts used are acid-releasing compounds which by reaction with the alkali metal silicate in the waterglass precipitate free silicic acid, such as, for example, bicarbonates or hydrogen sulfates of alkali metals or of ammonium, preferably sodium bicarbonate and sodium hydrogen sulfate, or alkyl carboxylates having 2 to 14, preferably 4 to 12, C atoms each in the alkyl part and in the carboxylic acid part. Glyoxal is particularly preferably used since it is soluble in water, non-flammable, of low toxicity and controllable in its reaction time. To obtain adequate consolidation of the shaped article, an amount of waterglass is used which is such that the amount of alkali metal silicate is 5 to 15% by weight, relative to the mixture of the mineral. 0.1 to 4% by weight, likewise relative to the mineral, of catalyst are required. To obtain a better state of dispersion, the waterglass and the catalyst are diluted with 1- to 5-times the amount of water before mixing with the mineral. This mixing of the mineral which has been rendered hydrophobic with water-glass and catalyst is carried out for about 2 to 10 minutes in a mixing unit suitable for this purpose.

This mixture of expanded mineral which has been rendered hydrophobic, waterglass and catalyst can then be consolidated to give any type of shaped articles in the manner described above by using calcium aluminate and aluminum phosphate as binder. After 5 to 30 minutes, the article can be removed from the mold and dried. Tunnel furnaces or heating chambers of conventional design are suitable for use in the drying process, but drying by means of microwaves or in high-frequency dryers is particularly advantageous.

Possible shaped articles which can be prepared in the manner described above are above all panels which are used on their own or together with gypsum plasterboards as thermal and acoustic insulating ceiling and wall panels. By using suitable molds, it is also possible to prepare hollow articles which are suitable for use as leakproof packaging material or plant pots, in the pores of which, owing to their open pore structure, fertilizer and plant protection agent depots can be incorporated. By means of cubical and cylindrical molds, articles can be prepared which can be inserted in concrete floors and precast concrete elements as conduits for installations. Roof tiles and cement-bound roofing and facade panels can also be coated with the mixture described above and thus obtain an insulating coating.

EXAMPLE 1

100 g of vermiculite were rendered hydrophobic by means of 0.5% of a polymethylsiloxane of molecular weight 40,000 by being sprayed with a 10% strength aqueous solution. After drying, the vermiculite was mixed with 100 g of a mixture of 32 g of 35–37 Be° of sodium silicate, 65 g of water and 3 g of glyoxal. The resulting mixture was poured into a 10×10 cm sized mold and compacted by means of a pressure of 10 N/cm$^2$. The finished article was dried for 5 minutes in a microwave oven having a power consumption of 600 W. A panel was obtained which had a density of 200 g/l and very good stability.

EXAMPLE 2

100 g of vermiculite were sprayed with an aqueous solution containing 10% of dioctyl dimethylsiliconate and 2% of acetic acid and dried. The amount of siliconate, relative to vermiculite, was 0.5% by weight. The vermiculite thus rendered hydrophobic was then mixed with 75 g of a mixture of 40 g of 35–37 Be° sodium silicate, 55 g of water and 5 g of glyoxal. The mixture was then poured into a 10×10 cm sized mold and compacted by means of a pressure of 1.5 N/cm$^2$ and then dried as in Example 1. An article was obtained which had a density of 21 g/l and good stability.

EXAMPLE 3

100 g of perlite were sprayed with 0.5% of a silicone resin and thermally condensed. The perlite thus rendered hydrophobic was then thoroughly mixed for 3 minutes with 2.5 g of a high alumina cement composed of 37% of CaO, 40% of Al$_2$O$_3$, 15% of FeO$_3$ and SiO$_2$ as remainder and 16 g of a 50% strength aluminum phosphate solution and a further 35 ml of water. The composition was compacted in a 10×10 cm sized mold under a pressure of 50 N/cm$^2$ and condensed at 160° C. A panel was obtained which had excellent edge stability and a density of 280 g/l.

EXAMPLE 4

100 g of perlite were mixed with 3 g of high alumina cement and then rendered hydrophobic, by spraying, with 2% of sodium methylsiliconate in the form of a 10% strength aqueous solution. After drying, 16 g of a 50% strength aluminum phosphate solution and 20 ml of water were added to the mixture and the panel was treated as described in Example 3. A panel was obtained which had a density of 360 g/l and outstanding edge stability.

COMPARATIVE EXAMPLE 80 g of perlite which had not been rendered hydrophobic were mixed without the addition of high alumina cement with a mixture of 16 g of a 50% strength aluminum phosphate solution and 90 ml of water. The composition was introduced into a 10×10 cm mold. Even after 30 minutes the article could not be demolded. After drying in the mold, a panel resulted which had low abrasion resistance and edge stability. 100 g of vermiculite which had not been rendered hydrophobic were mixed with 40 g of waterglass, 250 ml of water and 5 g of glyoxal to give a composition having a surface wetness like that of the composition described in Example 2. Pressing produced crumbly vermiculite pieces without strength.

We claim:

1. A shaped article made from expanded minerals, obtained by using a mineral binder system consisting essentially either of calcium aluminate and aluminum phosphate or of waterglass and a catalyst to consolidate an expanded mineral which has been rendered hydrophobic and wherein the expanded mineral is rendered hydrophobic by means of an organosiloxane of the formulae

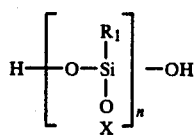

in which $R_1$ denotes $C_1$-$C_7$-alkyl, preferably methyl, $C_2$-$C_7$-alkenyl, phenyl or benzyl, X denotes an alkali metal ion and n denotes a number from 1 to 10,

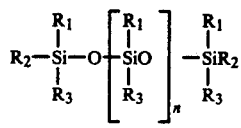

in which $R_1$, $R_2$ and $R_3$ denote $C_1$-$C_8$-alkyl, preferably methyl, $C_2$-$C_8$-alkenyl, phenyl, benzyl or styryl and n denotes a number from 1 to 1,000,

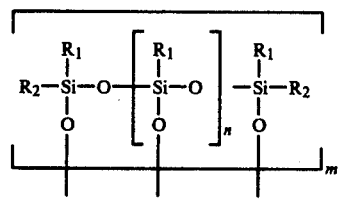

in which $R_1$ and $R_2$ denote $C_1$-$C_8$-alkyl, preferably methyl, $C_2$-$C_8$-alkenyl, phenyl, benzyl or styryl and n denotes a number from 1 to 100 and m denotes a number from 1 to 100 or

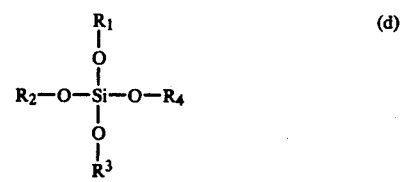

in which $R_1$ and $R_2$ can be identical or different and denote $C_1$-$C_{20}$-alkyl, $C_2$-$C_{18}$-alkenyl, $C_1$-$C_{12}$-alkylphenyl, $C_2$-$C_{18}$-acyl or $C_2$-$C_{18}$-alkyl which is substituted in the $\omega$-position by a carboxyl, amino, hydroxyl or oxirane group and $R_3$ and $R_4$ can be identical or different and denote $C_1$-$C_4$-alkyl, $C_2$-$C_7$-alkenyl, phenyl, benzoyl or benzyl.

2. A shaped article as claimed in claim 1, obtained by consolidation of an expanded mineral which has been rendered hydrophobic by means of an organosiloxane of the formulae (a), (b) or (c) in which $R_1$ denotes methyl in each case.

3. A shaped article as claimed in claim 1, obtained by consolidation of an expanded mineral which has been rendered hydrophobic by means of 0.1 to 5% by weight of the organosiloxane.

4. A shaped article as claimed in claim 1, obtained by using 2 to 25% by weight of aluminum phosphate, relative to the expanded mineral, and 10 to 50% by weight of calcium aluminate, relative to the aluminum phosphate, to consolidate the expanded mineral which has been rendered hydrophobic by means of the organosiloxane.

5. A shaped article as claimed in claim 1, obtained by using 5 to 15% by weight of an alkali metal silicate in the form of waterglass and 0.1 to 4% by weight of a catalyst, relative to the expanded mineral, to consolidate the expanded mineral which has been rendered hydrophobic by means of the organosiloxane.

* * * * *